United States Patent [19]

Yakushiji

[11] Patent Number: 4,999,794

[45] Date of Patent: Mar. 12, 1991

[54] ELECTRONIC DEVICE FOR REDUCING THE POWER CONSUMPTION DURING THE SUPPLY OF BACK UP POWER

[75] Inventor: Akira Yakushiji, Nara, Japan

[73] Assignee: Sharp Kabushiki Kaisha, Osaka, Japan

[21] Appl. No.: 323,383

[22] Filed: Mar. 14, 1989

[30] Foreign Application Priority Data

Mar. 14, 1988 [JP] Japan ................................. 63-34109

[51] Int. Cl.[5] .............................................. G06F 1/00
[52] U.S. Cl. .................................................. 364/707
[58] Field of Search ........................................ 364/707

[56] References Cited

U.S. PATENT DOCUMENTS

| | | | |
|---|---|---|---|
| 4,317,180 | 2/1982 | Lies | 364/707 |
| 4,317,181 | 2/1982 | Teza et al. | 364/707 |
| 4,381,552 | 4/1983 | Nocilini et al. | 364/707 |
| 4,780,843 | 10/1988 | Tietjen | 364/707 |
| 4,851,987 | 7/1989 | Day | 364/707 |

FOREIGN PATENT DOCUMENTS 55-95164 7/1980 Japan ................................. 364/707
63-15346 1/1988 Japan .

Primary Examiner—Dale M. Shaw
Assistant Examiner—Long T. Nguyen

[57] ABSTRACT

A small-sized electronic device is provided with a key board and an LCD display unit outside the body and incorporating a CPU including a clock circuit for measuring a time and a RAM for storing the data; a battery for supplying the body with electric power; a backup power source for supplying the body with the electric power when removing the battery from the body; and a change-over circuit for selecting either the battery or the backup power source inside the body. A clock circuit is arranged so that when a stop indication of the clock circuit is input from the key board, the CPU stops the operation of the clock circuit and if the backup power source is selected, the backup electric power is supplied to the RAM. Accordingly, the backup time for storage contents is extended.

11 Claims, 4 Drawing Sheets

ELECTRONIC DEVICE FOR REDUCING THE POWER CONSUMPTION DURING THE SUPPLY OF BACK UP POWER

BACKGROUND OF THE INVENTION

1. Field of the Invention

The present invention relates to an electronic device and more particularly to a small-sized electronic device having storage and backup functions such as a small electronic memorandom.

2. Description of the Related Art

This type of small-sized conventional electronic device is arranged so that when a battery for supplying the device body with electricity is replaced, the change-over to a backup power source is effected and the contents of a RAM are not erased. For the backup power source, a supplementary battery or a capacitor has been conventionally used. A microprocessor installed in the electronic device typically incorporates a clock circuit. The clock circuit invariably in an operating state, and hence the electric power supplied from the backup power source is consumed in this clock circuit.

After removing the battery from the device body for replacement the above-mentioned electronic device using the capacitor as the backup power source, the contents of the RAM are held by capacities accumulated in the capacitor. For this reason, the electric current consumed by the clock circuit presents a problem. More specifically, the clock circuit consumes the capacities accumulated in the capacitor in a short period of time. Thereby a problem arises since the time for holding the contents of RAM is shortened. An additional problem is that if the capacitor is arranged in a large configuration to retain the RAM contents for a long time, the size of the electronic device body is dominated by the capacitor so that a compact device body cannot be attained.

An improvement of a memory protect circuit is disclosed in Japanese Published Unexamined Patent Application No. 63-15346. The memory protect circuit is provided with a power source change-over unit that is capable of changing the power source supplied to the memory to an auxiliary power source. However, this reference does not, disclose an arrangement which extends the time for backing up the memory contents by stopping the clock circuit.

SUMMARY OF THE INVENTION

The present invention provides an electronic device comprising: input means for inputting pieces of information and a variety of indications; storage means for storing the information in a readable form; display means for displaying the variety of information; clock means for measuring a time; main power source supplying means for supplying the storage means and the clock means with electric power; backup power source means for supplying a substitute power source when cutting off the supply from said main power source supplying means to the storage means as and the clock means; change-over means for selecting between said main power source supplying means and said backup power source means as a power supply source; control means, connected to the said power supply source selected by the change-over means, for controlling the clock means and the storage means according to the variety of indications inputted from the input means; stop indicating means for indicating the stop of operation of the clock means; and clock stopping means for stopping the clock means in response to receiving the stop of operation from said indicating means, thereby the time for backing up the storage means when the change-over means selects the backup power source supplying means is extended.

The power source supplying means may be composed of a primary or a secondary battery, and the backup power source supplying means may be a capacitor. The control means usually includes a one-chip CPU incorporating a clock circuit defined as the clock means and a RAM defined as the storage means. The input means may include a keyboard and the stop indicating means may be assigned to a predetermined key of the key board.

The backup function in the present invention may be construed as a function for holding the storage contents of the RAM.

According to the present invention, upon receiving a stop indication from the stop indicating means when changing the power source supplying means to the backup power source supplying means, the clock stopping means stops the clock means, while the control means is brought into a standby-state. It is therefore possible to reduce the consumption of electric power of the backup power source supplying means and to extend the backup time of the storage means.

BRIEF DESCRIPTION OF THE DRAWINGS

Other objects and advantages of the invention will become apparent during the following discussion in conjunction with the accompanying drawings, in which.

DESCRIPTION OF THE PREFERRED EMBODIMENTS OF THE PRESENT INVENTION

Figure 1:
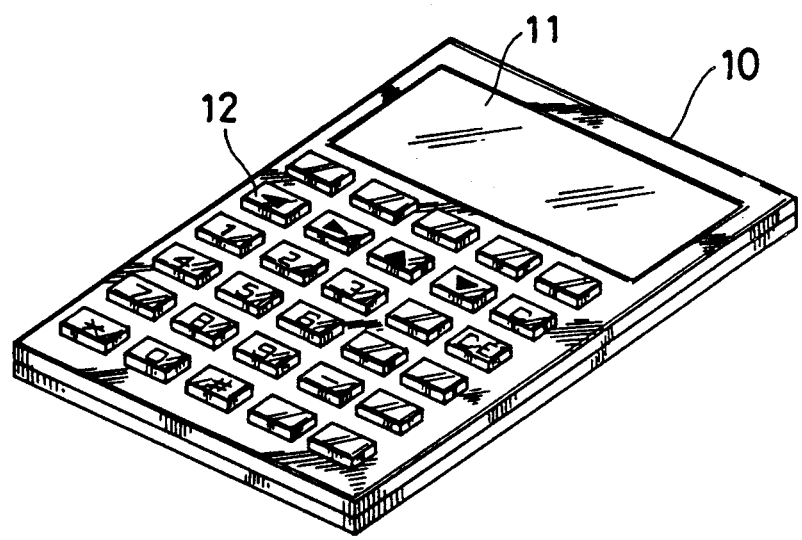
FIG. 1 is a perspective view illustrating an external appearance of an electronic memorandom showing an embodiment according to the present invention.

In FIG. 1, the electronic memorandom has a memo function which incorporates a telephone directory, schedules, and an electronic desk calculator function. These functions are selected by a mode change-over key.

Referring to FIG. 1 a body 10 equipped with a display unit 11 and input keys 12 for inputting a variety of indications and character information. The display unit 11 of a conventional LCD display or other display elements such as LEDs. To be specific, the input keys include character input keys for inputting names and addresses, numeral keys for inputting telephone numbers and similar information and a clock circuit stop key for stopping a the clock circuit which will be described below.

Figure 2:
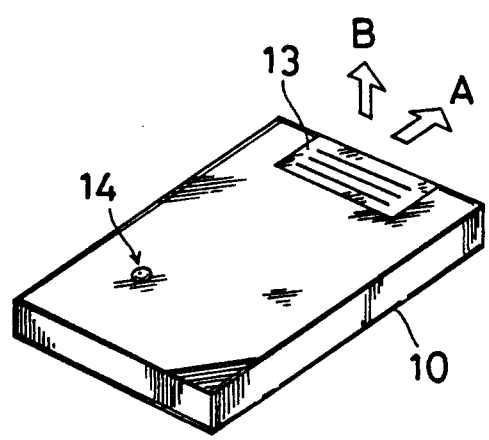
FIG. 2 is a perspective view illustrating the bottom side of the electronic memorandom of FIG. 1.

FIG. 2 is a perspective view illustrating the bottom side of the body 10. In FIG. 2, a detachable battery cover is typically arranged for being removed from body 10 by sliding the battery cover 13 in the direction indicated by an arrow A or pulling it up in the direction indicated by an arrow B. When taking off the battery cover 13 to remove a battery from body 10, a microprocessor built in the body 10 is supplied with electric power from a backup power source circuit. Also, a key hole 14 is disposed on the bottom of the body 10 and the key hole 14 will also be described below.

Figure 3:
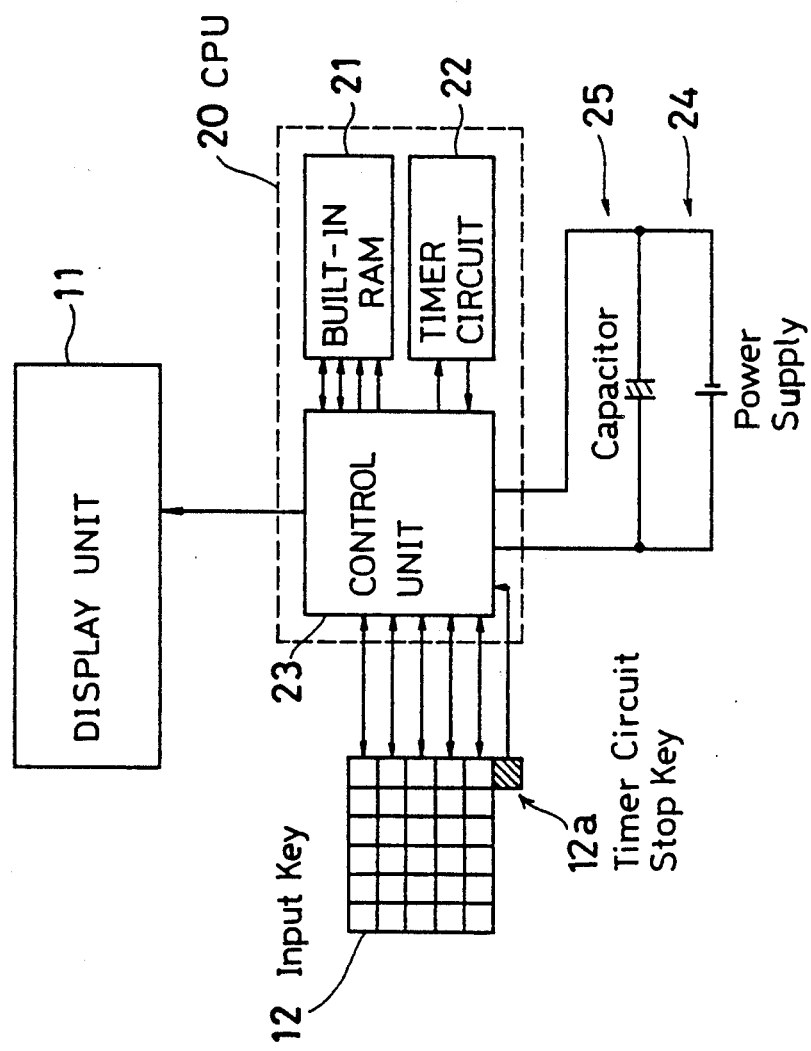
FIG. 3 is a block diagram illustrating the embodiment of FIG. 1.

FIG. 3 is a block diagram illustrating an embodiment of the present invention. Referring to FIG. 3, a one-chip CPU 20 is internally sectioned into a storage element unit 21 (hereinafter referred to as a built-in RAM), a clock circuit 22 and a control unit 23 (including various control circuits and arithmetic processing circuits) for controlling the above-described components including a clock stopping device. The built-in RAM 21 stores, as in the case of an electronic memorandum exemplified in this embodiment, telephone numbers, memos and so on. Input keys 12, a power source 24 which includes a battery, a backup power source 25 and the foregoing display unit 11 are provided outside of the CPU 20 and these external components are connected to the CPU 20. A clock circuit stop key for inputting a stop indication for the clock circuit 22 is assigned to one of input keys 12, so that the stop indication is may be inputted to the CPU 20. Note that the battery may be a primary or a secondary battery.

Figure 4:
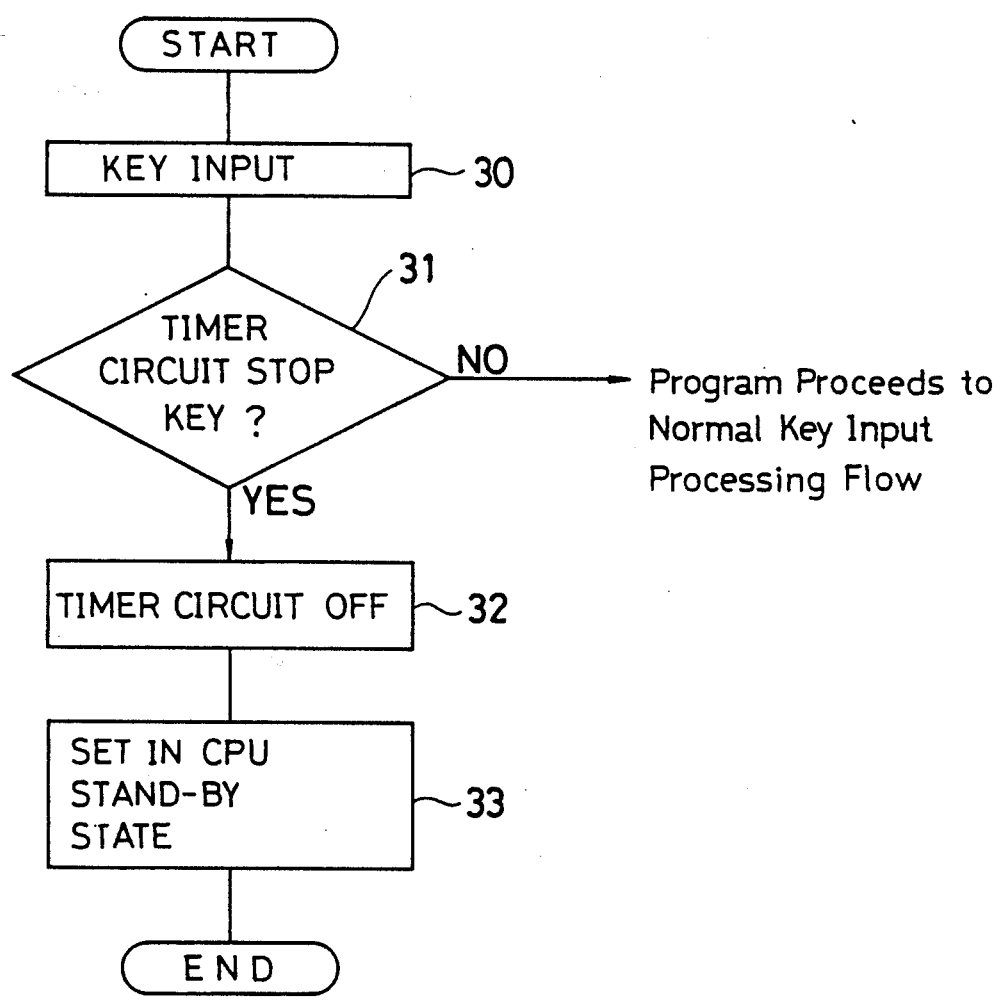
FIG. 4 is a flowchart for explaining the operation of the embodiment of FIG. 1.

The description will next focus on the operation of the present embodiment by referring to the flowchart of FIG. 4.

Upon manipulation of a key among the input keys 12 (step 30), the operation starts by determining whether the clock circuit stop key has been initiated (step 31). As a result of determination, if the key is other than the clock circuit stop key, the program proceeds, as in the conventional manner, to a normal key processing flow. Whereas if the key is determined to be the clock circuit stop key, the clock circuit 22 incorporated in CPU 20 is stopped (step 32). Subsequently, the software is also stopped. When halting the clock circuit 22, individual signal levels of the CPU 20 are simultaneously fixed by pull-up/pull-down resistances provided inside of the CPU 20. Thereby, unnecessary electric currents are prevented from flowing into recessed passageways. Then, the CPU 20 itself is set to standby for low consumption of the electric currents (step 33).

Figure 5A:
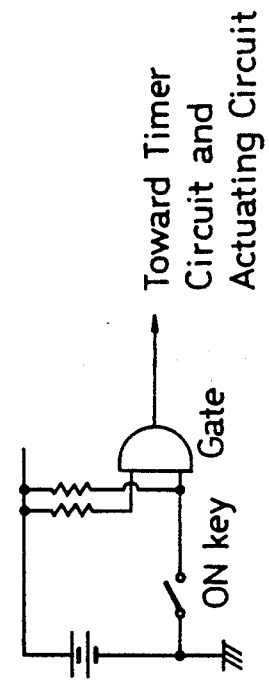
FIG. 5(a) and 5(b) are circuit diagrams illustrating two embodiments for CPU operation returning means for the embodiment of FIG. 1.
Figure 5B:
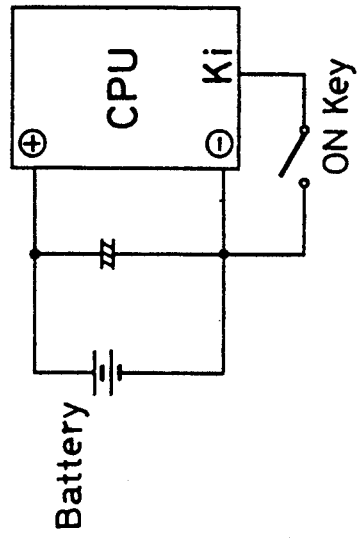

The software does not function during standby, and a return to the original CPU operation is therefore executed by hardware. As illustrated in FIG. 5(a), a clock starting circuit is triggered by depressing an ON key, composed of a (−) battery and a signal Ki, for restarting the clock. Logically, as illustrated in FIG. 5(b), the condition can be changed by using the on key and applying the (−) battery to one gate input. It is to be noted that the clock circuit stop key 12a is preferably disposed on the underside of body 10 rather than on the surface thereof because the stop key is generally only operated when replacing the battery. The clock circuit stop key 12a may be arranged to interlock with the battery cover 13 so that the stop key 12a is initiated instantaneously to moving the battery cover 13. A key switch (not illustrated) may be accommodated in the key hole 14 perforated in the underside of the body 10 so that the clock circuit stop key functions in response to an operation from the outside of the body 10.

Comparisons between the respective periods of backup time are made when the CPU 20 works (the clock circuit is turned ON) and during the standby (the clock circuit is turned OFF). In an ordinary small-sized electronic device with a clock, however, the electric current consumed by the clock circuit is set to 5 μA, while the current consumed by the RAM is 0.1 μA.

In the case when a capacitor of 10 μF is equipped as a circuit backup, the battery is removed from the body, and the time T for which the voltage can be maintained by only the capacity of the capacitor is given by:

$$V_o = V_{ie}^{-\frac{T}{CR}}$$

$$T = -CR \ln V_o/V_i.$$

By replacing the foregoing values thereinto, $$T = -10 \times 10^{-6} \times \frac{3(V)}{5.1 \times 10^{-6}(A)} \times \ln \frac{2(V)}{3(V)} \approx 2.4 \text{ (sec)}.$$

However, the CPU current becomes 0.1 μA when the CPU is in the standby-state, and hence $$T \approx 60(\text{sec}).$$

Figure 6:
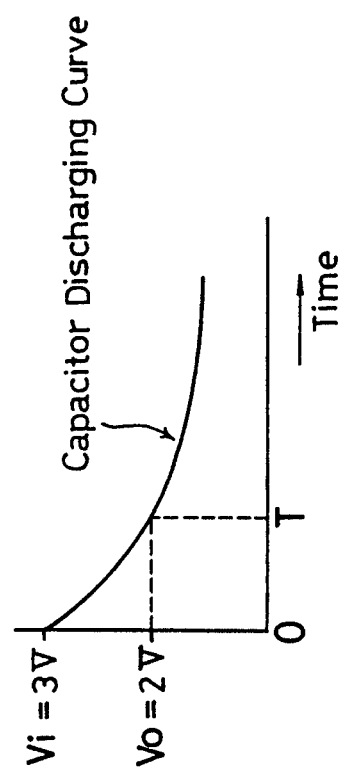
FIG. 6 is a graph illustrating characteristics of a capacitor discharging curve for the backup time.

Therefore, the backup time can remarkably be improved. Incidentally, FIG. 6 illustrates a capacitor discharging curve for the backup time.

Although only one embodiment of the invention has been disclosed and described, it is apparent that other embodiments and modifications of the invention are possible and all such modifications as would be obvious to one skilled in the art are intended to be included within the scope of the following claims.

What is claimed is:

1. An electronic device comprising:
    input means for inputting data and display information;
    storage means for storing said data information in a readable form;
    display means for displaying said display information;
    clock means for measuring a time;
    main power source supplying means for supplying said storage means and said clock means with electric power;
    backup power source supplying means for supplying a substitute power source to only said storage means when said electric power from said main power source supplying means to said storage means and said clock means is cut off;
    change-over means for selectively switching between said main power source supplying means and said backup power source supplying means;
    control means, connected to one side of said main power source supplying means selected by said change-over means, for controlling said clock means and said storage means in response to said data inputted from said input means;
    stop indicating means for indicating a stop of operation of said clock means; and
    clock stopping means for stopping said clock means in response to said stop indicating means, thereby the time for backing up said storage means when said change-over means selects said backup power source supplying means is extended.

2. An electronic device according to claim 1, wherein said storage means comprises a random access memory, said clock means comprises a timer clock and said control means comprises a one-chip central processing unit including said random access memory and said timer clock.

3. An electronic device according to claim 1, wherein said main power source supplying means comprises a battery, and said backup power source supplying means comprises a capacitor.

4. An electronic device according to claim 3, wherein said main power source supplying means comprises a primary battery.

5. An electronic device according to claim 3, wherein said main power source supplying means comprises a secondary battery.

6. An electronic device according to claim 1, wherein said input means comprises a key board having a plurality of keys, and a predetermined key from said plurality of keys of said key board for initiating the stop of operation of said clock means.

7. An electronic device according to claim 1, wherein said clock stopping means comprises a central processing unit.

8. An electronic device according to claim 1, wherein said change-over means comprises a cover for said main power source supplying means connected to said stop indicating means for selectively changing from said main power source supplying means to said backup power source supplying means when said cover is removed.

9. An electronic device having a memory for storing information and a clock for measuring time, comprising:
   main power source supplying means for supplying main power to said memory and said clock;
   backup power source supplying means for supplying backup power to said memory when said main power from said main power source supplying means to said memory and said clock is cut off;
   a stop indicator for initiating a stop operation of the clock;
   change-over means connected to said stop indicator for selectively switching from said main power source supplying means to said backup power source supplying means and initiating said stop indicator when said main power source supplying means is removed from the device; and
   clock stopping means for stopping said clock in response to said stop indicator being initiated and extending the amount of time for supplying backup power to said memory which maintains said information in said memory.

10. An electronic device according to claim 9, wherein said main power source supplying means comprises a battery and said backup power source supplying means comprises a capacitor.

11. A method for supplying power to an electronic device having a memory for storing information and a clock for measuring time comprising the steps of:
   (a) supplying power to said memory and said clock by a main power source;
   (b) selectively switching from said main power source to a backup power source which supplies power only to said memory when said main power source is removed from the device;
   (c) initiating a stop operation of the clock in response to said step (b); and
   (d) discontinuing the supply of power to said clock in response to the initiation of said stop operation and extending the amount of time for supplying power to said memory which maintains said information in said memory.

* * * * *